United States Patent [19]

Mallory et al.

[11] Patent Number: 4,945,220

[45] Date of Patent: Jul. 31, 1990

[54] AUTOFOCUSING SYSTEM FOR MICROSCOPE HAVING CONTRAST DETECTION MEANS

[75] Inventors: Chester L. Mallory, Campbell; Phillip D. Wasserman, Cupertino; Hung V. Pham, San Jose; Barry G. Broome, Glendora, all of Calif.

[73] Assignee: Prometrix Corporation, Santa Clara, Calif.

[21] Appl. No.: 272,597

[22] Filed: Nov. 16, 1988

[51] Int. Cl.$^5$ .............................................. G01J 1/20
[52] U.S. Cl. ................................. 250/201.3; 250/201.7
[58] Field of Search ............ 250/201 AT, 201 R, 204; 354/403; 356/4

[56] References Cited

U.S. PATENT DOCUMENTS

| | | | |
|---|---|---|---|
| 4,255,029 | 3/1981 | Freudenschuss | 250/201 |
| 4,347,001 | 8/1982 | Levy et al. | 356/398 |
| 4,363,961 | 12/1982 | Okada et al. | 250/201 |
| 4,363,962 | 12/1982 | Shida | 250/201 |
| 4,373,817 | 2/1983 | Coates | 356/384 |
| 4,433,235 | 2/1984 | Akiyama et al. | 250/201 |
| 4,447,717 | 5/1984 | Nohda | 250/201 |
| 4,448,532 | 5/1984 | Joseph et al. | 356/394 |
| 4,521,686 | 6/1985 | Coates et al. | 250/237 R |
| 4,532,650 | 7/1985 | Wihl et al. | 382/8 |
| 4,555,798 | 11/1985 | Broadbent, Jr. et al. | 382/8 |
| 4,556,317 | 12/1985 | Sandland et al. | 356/237 |
| 4,564,296 | 1/1986 | Oshida | 250/201 |
| 4,595,829 | 6/1986 | Newmann ete al. | 250/201 |
| 4,600,832 | 7/1986 | Grund | 250/201 |
| 4,604,910 | 8/1986 | Chadwick et al. | 74/96 |
| 4,609,814 | 9/1986 | Nobuaki et al. | 250/201 |
| 4,618,938 | 10/1986 | Sandland et al. | 364/552 |
| 4,633,504 | 12/1986 | Wihl | 382/54 |
| 4,639,587 | 1/1987 | Chadwick et al. | 250/201 |
| 4,644,172 | 2/1987 | Sandland et al. | 250/548 |
| 4,656,358 | 4/1987 | Divens et al. | 250/372 |
| 4,663,732 | 5/1987 | Robinson | 364/900 |
| 4,687,913 | 8/1987 | Chaban | 250/201 |
| 4,695,893 | 9/1987 | Makino | 354/403 |
| 4,701,606 | 10/1987 | Tanimoto et al. | 250/201 |
| 4,705,940 | 11/1987 | Kohno | 250/201 |
| 4,725,722 | 2/1988 | Maeda | 356/4 |
| 4,801,963 | 1/1989 | Koyama | 354/403 |

*Primary Examiner*—David C. Nelms
*Assistant Examiner*—Sherrie Hsia
*Attorney, Agent, or Firm*—Townsend and Townsend

[57] ABSTRACT

An autofocusing system for a microscope is disclosed. An autofocus target is placed between a colliminating lens and a relay lens of the microscope. The autofocus target contains a pattern of dark areas which are projected onto a specimen and reflected into a CCD camera array. The focus of the microscope is adjusted such that the variation in intensity of light through the pattern is maximized.

27 Claims, 2 Drawing Sheets

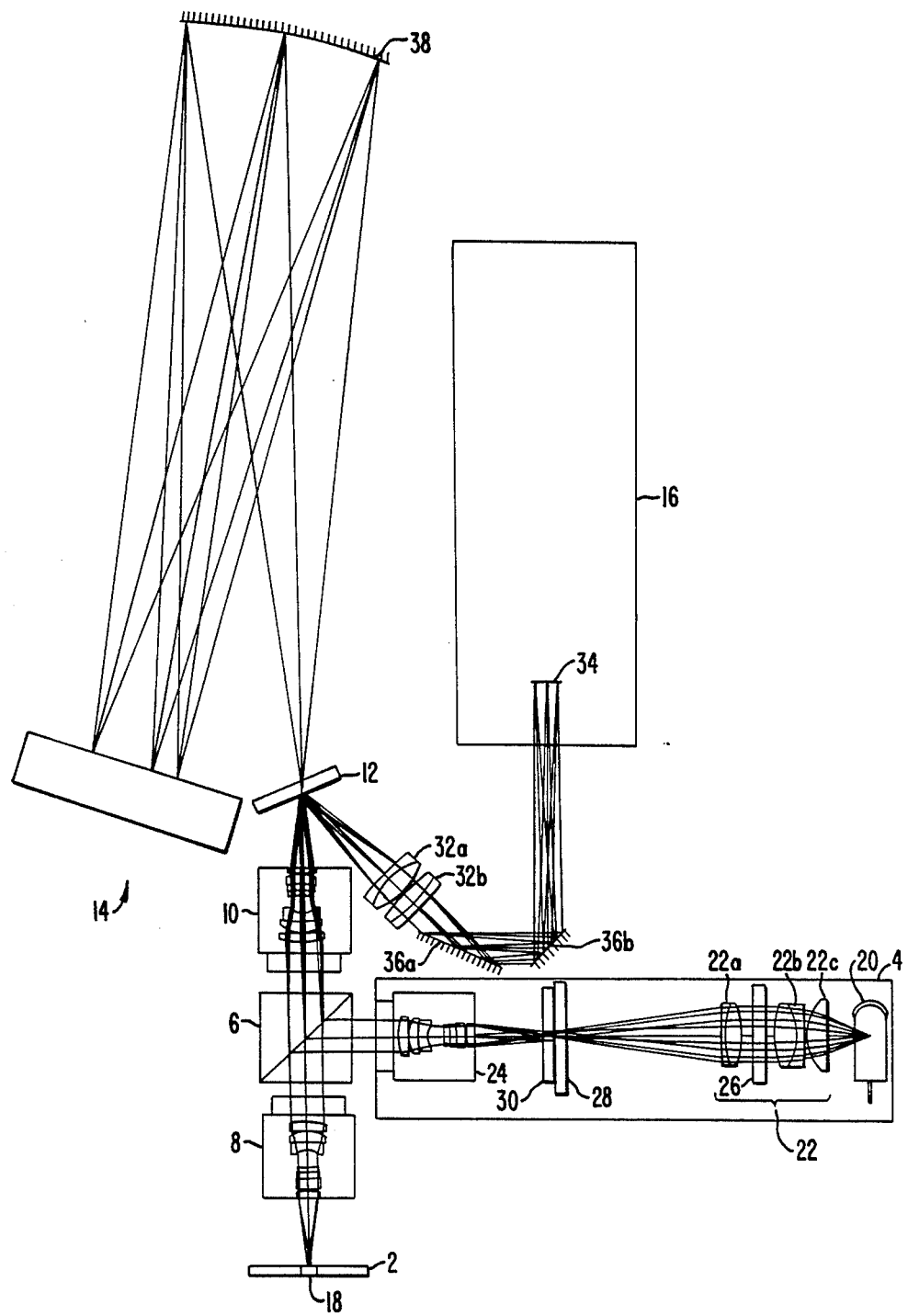
FIG._1.

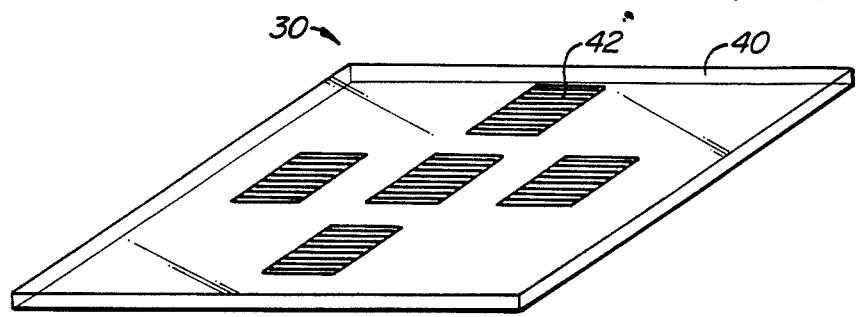
FIG._2.
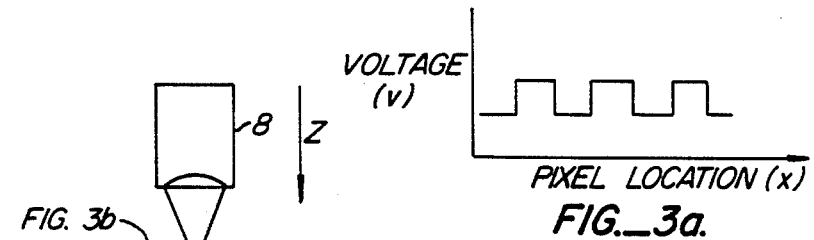
FIG._3.     FIG._3a.
FIG._3b.
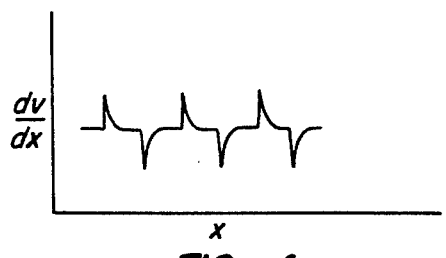
FIG._4a.
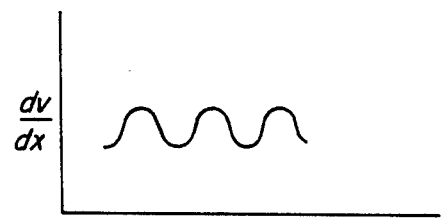
FIG._4b.
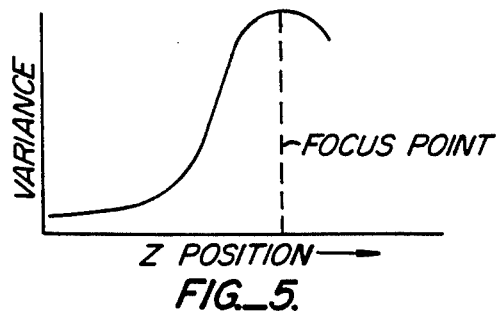
FIG._5.

AUTOFOCUSING SYSTEM FOR MICROSCOPE HAVING CONTRAST DETECTION MEANS

COPYRIGHT NOTICE

A portion of this disclosure contains material which is subject to copyright protection. The owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates to the field of semiconductor inspection. More particularly, the present invention provides an automated method and apparatus for focusing a microscope on semiconductor wafers and other specimens.

2. Description of Related Art

In the process of manufacturing semiconductors, a series of photolithographic steps are interspersed with chemical or other treatments to define circuits in and on a semiconductor wafer. For example, a lithographic step may be used to form a pattern of photoresist on the wafer to expose (or protect) the portions of the wafer that are to be subjected to a subsequent treatment step. Each of the processing steps executed in the fabrication of the semiconductor devices on a wafer must be executed with extreme precision or the resulting devices will not be functional. For example variations in thicknesses or line widths of only a micrometer (micron) can destroy an entire wafer.

Microscopes have long been used in the inspection and fabrication of semiconductor devices and other devices which require precision in their manufacturing processes. Such microscopes may be used for examining the semiconductor device for particulates, physical defects, or other inspection tasks during the production process.

It is desirable to provide automatic focusing systems for the microscopes used in these processes and, accordingly, a wide variety of automatic focusing systems have been proposed. For example, U.S. Pat. No. 4,600,832 (Grund) describes an autofocusing system in which sharply defined edges on the specimen are used to focus the microscope. An "edge value" is determined, and the edge value is minimized, at which time the microscope is assumed to be in focus. The method assumes, of course, that the specimen contains sharply defined edges in the first event. Further, it assumes that diffracted edge profiles from the lines do not interfere with the focus calculation.

U.S. Pat. No. 4,639,587 (Chadwick et al.) discloses an automatic focusing system in which a chopper alternately admits light to one of two optical paths. Light from the two optical paths is directed at the target article to cast alternating images thereon. The alternating images are ultimately "subtracted" and the device focus is adjusted until the difference is essentially zero, at which time the image is assumed to be in focus.

The device described by Chadwick et al. has a number of disadvantages. The system described by Chadwick is believed by the inventors herein to be unduly sensitive to opto-mechanical alignment, long term stability, optical path through the "flipping pupil", and the like, due to the complexity of the system. Further, the system is believed to be difficult to focus on dark samples, i.e., samples which absorb significant amounts of light at a wavelength of interest.

U.S. Pat. No. 4,595,829 (Neumann et al.) discloses an autofocusing system in which a laser beam is directed at the surface of the sample through the objective lens. Markers 10a and 10b (see FIGS. 2 and 3 of Neumann et al.) are used to locate the position of an "invisible" measuring spot 16. The system described in a Neumann et al. is believed to be difficult to utilize when a sample absorbs light at the wavelength of a measuring beam used for focusing. Further, focusing is based on a beam projected through an "edge" of a lens, resulting in inaccuracies in the focus. Further, the system must be readjusted for each objective.

Another automatic focusing system is described in U.S. Pat. Nos. 4,556,317, 4,618,938 and 4,644,172 (Sandland et al., see especially column 19, line 49 et. seq. of 4,644,172). The automatic focusing system of Sandland et al. directs 600 nanometer wavelength light at a pupil stop which contains an eccentric pin hole aperture which offsets an image location. This system suffers from many of the disadvantages of Chadwick U.S. Pat. No. 4,639,587. The offset is adjusted by adjusting the focus of the microscope until the image of the projection reticle falls on the reticle so that the image of the reticle pattern is coincident with the reticle pattern itself.

Identical disclosure is found in U.S. Pat. No. 4,604,910 (Chadwick et al.). See also U.S. Pat. No. 4,347,001 which discloses another commonly used technique for focusing an inspection microscope at Column 10, line 39 et. seq.

Other related patents in the field include U.S. Pat. Nos. 4,656,358 (Divens et al.), 4,433,235 (Akiyama et al.), 4,448,532 (Joseph et al.), 4,532,650 (Wihl et al.), 4,555,798 (Broadbent, Jr. et al.), 4,633,504 (Wihl), 4,363,962 (Shida), 4,447,717 (Nohda), 4,363,961 (Okada et al.), 4,609,814 (Nobuaki et al.), 4,701,606 (Tanimoto et al.), 4,705,940 (Kohno), 4,687,913 (Chaban) and 4,663,732 (Robinson).

SUMMARY OF THE INVENTION

An automated method and apparatus for focusing a microscope is described. A series of dark or light spots are projected onto a sample through a microscope objective by placing a glass plate containing a pattern of opaque areas in an illumination beam. The reflected image from the sample is received at a charge coupled device (CCD) array. Light intensity along a path (preferably a line) of the CCD which traverses the image of the opaque areas is determined. The variation in the derivative of light intensity (or a factor related to light intensity) is used to drive the microscope to focus.

Accordingly, in one embodiment, the apparatus for focusing a microscope includes means for projecting an area of varied light intensity through an objective of the microscope onto a specimen surface; means for measuring light intensity of an image reflected from the surface at a plurality of locations lying substantially along a path passing through said varied light intensity area, and; means for adjusting a focus of the microscope until a variation in the light intensity from at least a first of the locations to a second of the locations is substantially maximized.

BRIEF DESCRIPTION OF THE FIGURES

FIG. 1 illustrates one embodiment of an optical system in which the invention herein may be utilized.

FIG. 2 is an isometric view of the autofocus plate shown in FIG. 1.

FIG. 3 shows the specimen in a focused position of the objective, as well as above and below focus.

FIGS. 3a and 3b show the value of voltage obtained in a line of pixels across a CCD in a microscope which is in focus and out of focus, respectively.

FIGS. 4a and 4b show the derivatives of the plots shown in FIGS. 3a and 3b, respectively.

FIG. 5 is a plot of variance in intensity versus position of the objective.

DETAILED DESCRIPTION

A magnification system utilizing the invention described herein is shown in FIG. 1. The magnification system is used by an operator to observe features of a specimen 2. Specimen 2 may be, for example, a silicon wafer having a layer of photoresist deposited thereon, or any one of a wide variety of samples which would be readily apparent to those of skill in the art, such as metallurgic specimens and the like. The magnification system generally includes an illumination system 4, a beam splitter 6, a microscope objective lens or lenses 8, an imaging lens 10, a reflective aperture plate 12, a spectrometer subsystem 14, and a CCD camera system 16. The spectrometer system is shown as an example of one application of the system, but is not required for the autofocusing system described.

The illumination system 4 serves to project light onto a viewing area (illustrated by 18) on the specimen 2. Light from the illumination system 4 is directed at beam splitter 6, then passes through the objective lens 8, and onto the sample. Light reflected from the sample is passed through the beam splitter, through the imaging lens 10 and ultimately into both the CCD camera 16 and the spectrometer system 14 via reflective aperture plate 12. Spectrometer system 14 could be replaced with, for example, simple photodetector for use as a microspot densitometer and the remaining portions of the system could be designed for use with a IR or UV illumination system, or the spectrometer could be eliminated and the system could be used as a standard video inspection microscope.

The illumination system 4 includes a tungsten-halogen incandescent lamp 20, a relay lens 22, a collimating lens 24, and wavelength selection filters 26. The relay lens utilizes three lenses 22a, 22b, and 22c that image the light from the lamp 20 onto a field stop 28 that is essentially coincident with a glass plate 30. The glass plate 30 contains an "autofocus pattern" discussed further below. The field stop 28 is a thin metal plate with a rectangular aperture that defines the illuminated region on the sample surface. In a preferred embodiment, the autofocus pattern and the field stop aperture are on a single glass plate instead of 2 glass plates as shown in FIG. 1. In the preferred embodiment the aperture in the field stop is 1.48 mm × 1.84 mm. The aperture dimensions do not need to be adjustable because changing the microscope objective 8 will correctly scale the illuminated area. The autofocus pattern 30 could be rotated out of the optical path if desired, but a glass substrate of equal thickness should remain in the optical path at all times.

The wavelength filters are placed in the illumination system so that short wavelength radiation can be eliminated when photoresist samples are being inspected. The thickness of the filter is not critical and it is not necessary to use a clear glass plate in this space when the filter is removed since the light rays are afocal between these lenses.

In some embodiments, an iris diaphragm (not shown) may be provided in the airspace between the relay lens doublets 22a and 22b. If employed this diaphragm can be used to reduce the illuminated entrance pupil area of the microscope objective. The images of some types of object structures can be enhanced by underfilling the entrance pupil (filling 70% of the entrance pupil is usually optimum). A reduction in image irradiance will also be observed if the pupil is underfilled.

The imaging optics include the microscope objective 8, the cube beamsplitter 6, the imaging lens 10, and the reflective aperture plate 12. Although one microscope objective 8 is shown it is to be understood that a plurality of objectives could be provided on a rotating nosepiece (e.g., a 5X, a 10X, a 50X and a 100X objectives). The autofocus system described herein may be used without adjustment for any one of a wide variety of objective magnifications. The microscope objectives, for example, may be the Olympus MS-PLAN series. These objectives differ from the typical microscope objectives in that they are flat-field designs, infinity conjugate corrected. The system could also readily be used with non-infinity conjugate corrected lenses in combination with proper optical elements to control the light path.

A 5X Olympus microscope objective also may be used for the imaging lens 10, as well as other magnifications. The magnification of the imaging lens can be selected from any one of a wide variety of magnifications. Since the colliminating lens, the objective lens and the imaging lens are operating at an infinity conjugate, their axial separation is not critical and can be selected from a wide range of values. In the preferred embodiment their centerlines, however, are coaxial to about 0.005 inch. The objective nearest the sample surface can be moved away from the beamsplitter if necessary to incorporate a rotating nosepiece assembly (not shown).

Note that while a microscope objective may be identified herein by its normal magnification value of, for example 5X, it is not used at these magnifications in the imaging system shown in FIG. 1. A 5X objective operating with the 5X imaging lens produces a 1X magnification of the image at the aperture plate. A 100X objective operating with the 5X imaging lens produces a 20X magnification at the aperture plate.

The reflective aperture plate 12 serves two functions. First, the aperture in the plate permits sampling of a very small region of the sample surface for the spectrometer system 14. Second, the reflective coating provides a reflective path for the TV camera subsystem. A TV display from the output of the charge coupled device (CCD) camera 16 will show the inspection field of view with a dark circular or square shaped spot (as a function of the shape of the aperture) at its center where the sample is extracted for the spectrometer.

The camera optics include a pair of lenses, 32a and 32b, which are used to re-image an intermediate image at the aperture plate onto the TV camera CCD surface 34. A magnification of 3.3X, for example, may be used to produce an inspection field minimum dimension that is 10X larger than the sample diameter. The lenses, are scaled such that the image is magnified to the size of the CCD array.

Two folding mirrors 36a and 36b may be used to minimize packaging volume. The arrangement also places the TV camera CCD in an orientation that eliminates the possibility of dust settling onto the photosurface. Preferably, an additional folding mirror (not shown) is used between elements 6 and 10 to place the camera and the remaining optical elements in a horizontal position for even better dust control. In one embodiment the CCD camera is a Sony XC-117/117P.

The spectrometer system 14 includes a grating 38 produced by American Holographic, Inc., Model No. 446.31. This grating is specifically designed for dispersing the 300 nm through 800 nm spectral band onto the flat surface of a 1.00 inch long CCD array.

The grating operates essentially as a relay for any single spectral line such that a 40 micron square appears as a 40 micron spot. Since the CCD array photosites are on 50 micron centers, the best spectral resolution is equivalent to one photosite. The 500 nm bandwidth is dispersed over 512 photosites, so L the spectral resolution is 1.0 nm. The reflection efficiency of the spectrometer is on the order of 0.30 over the spectral band of interest.

The autofocus plate 30 is shown in more detail in FIG. 2. The plate includes a glass plate or substrate 40 onto which a series of opaque areas 42, which are illustrated herein as squares, are placed. The squares may, for example, be formed on the glass plate by standard photolithographic processing and in one embodiment are opaque plated chrome areas having dimensions of approximately 25 micrometers by 25 micrometers, with a spacing of 25 micrometers. The chrome should be of sufficient thickness to block a significant percentage of the incident light (e.g., 0.20 micrometers). The pattern could also be created with an LCD and operated only when focusing. Aluminum, copper, or any other material which is opaque at a wavelength of interest could also be used.

It should be recognized that while the plate is shown herein with 5 squares placed thereon, in fact a wide variety of configurations could be chosen. For example, the invention herein could perform suitably in some applications with only a single square. Conversely, in a preferred embodiment the glass plate could include a series of approximately 10 squares along a line in the plane of the plate and passing through the center of the plate. The plate preferably lacks a dark, opaque area in the center to accommodate the spectrometer system. The squares need not be placed along more than 1 axis of the plate (e.g., horizontally), but it may be desired in some cases to provide squares along 2 axis (e.g., horizontally and vertically) for aesthetic purposes since a "crosshair" pattern is created on the CCD image. Alternatively a single vertical line could be used or any other pattern, providing that sampling from the CCD camera can be made at a sufficiently high speed.

The autofocus pattern is projected into the selected microscope objective via the beam splitter. The optical elements used to project the pattern onto the specimen are, in the preferred embodiment, of sufficient quality that sharp edges of the autofocus pattern are produced with high fidelity and contrast (although the invention described herein would still find a "best" focus, even if the optics did not produce a sharp image of the autofocus pattern). Only at the focal point of the objective will the autofocus be projected as a sharply defined image of the autofocus pattern. This method ensures that a high contrast image is available for focusing even if the surface features of interest have low contrast.

It should be noted that an additional beam splitter (not shown) could be placed between element 10 and the CCD camera 16. The second beam could be sent to a separate linear or array CCD which could be used only for an autofocus function. Note also that an IR beam splitter could be used in combination with an IR filtering pattern on plate 30. An IR CCD detector could then be used for autofocus in which case the autofocus pattern would not be observed in the visible CCD camera 16.

The resulting image is presented to the video camera 34 or a line scanner where it is converted into an electrical signal. In the preferred embodiment, a line of pixels across the resulting image through the pattern contains alternating bright and dark regions. These are represented in an electrical signal from the CCD imager along this line by alternating high and low voltages from the camera pixels. Referring to FIG. 3, when the specimen 2 is located at the focus position of the objective 8, the edges of the image are sharp. The resulting plot of voltage obtained from the pixels as a function of the location of the pixel has steep rise and fall times as shown in FIG. 3a. On the other hand if the specimen is above or below the focus position of the objective, the edges of the image are graded and the electrical signal has more gradual rise and fall times as shown in FIG. 3b. Thus, focus can be detected by the steepness of the rise and fall times of an electrical signal related to light intensity along a path passing through the opaque areas. It is to be understood that while the invention is illustrated herein by way of voltage from the pixels, any factor related to the intensity of light may be used.

The derivative of the electrical signal provides a convenient measure of the rise/fall times and hence of the degree of focus. FIGS. 4a and 4b show the differentiated version of FIGS. 3a and 3b. Lower peak amplitude results from differentiating the out of focus signal from FIG. 3b. Thus peak amplitude of the differentiated CCD output signal provides a measure of focus.

To emphasize the peak amplitude and make the measure insensitive to polarity of the edges, a variance of the derivative (see FIG. 5) is used as a measure of focus. The variance is be calculated according to a formula having the form:

$$\text{variance} = \frac{\sum_{i=1}^{N} (dv_i)^2}{N-1} - \frac{\left(\sum_{i=1}^{N} dv_i\right)^2}{N(N-1)}$$

where:

$N$ = the number of pixels
$dv_i$ = the value of the derivative of voltage at a pixel $i$ Note that the last half of the above expression will have a value of zero if the derivatives have zero mean (the usual case), and therefore need not be calculated. Note also that the derivative may be estimated at a pixel $i$ by the formula;

$$dv_i = v_i - v_{i-1}$$

where
v is the voltage from a pixel.

In operation, the focusing process begins with the optical image out of focus in a known direction, for example, with the microscope focused too far rather than too close. The optical focus is adjusted at a substantially constant rate in the direction of image focus, while monitoring the magnitude of the variance either by observation or in a digital computer of the type readily known to those of skill in the art. As the image approaches focus, the variance will increase sharply as shown in FIG. 5. To be certain that the actual region of focus has been found, the variance may be required to exceed a pre-determined threshold T. Otherwise, "noise" can give a false indication that the region of focus is nearby.

When the magnitude of the variance exceeds T, the focusing adjustment continues in the same direction, but at a slower rate. In practice it is necessary to go past the peak value of variance to determine that the true peak has been found. This is done by detecting the first significant decline in variance following the peak. Due to noise in the process, it is necessary to impose a requirement that the variance drop by a fixed percentage P of the current peak, where P is typically 5 to 10%.

The threshold T may be calculated as follows:

$$T = C*A + K$$

where:

A is the average value of the squared instantaneous amplitudes of the signal for the sampled line.

C and K are emperically derived constants which depend upon the specific optics and surfaces to be observed. To avoid setting the threshold below the noise level on dark surfaces, T is never set below a minimum value, M, another emperically derived constant.

The following procedure is used to determine C and K in the preferred embodiment.

(1) Select a set of typical images I of varying brightness and contrast.

(2) For each image $I_i$, calculate the summation of the squares of voltage from each pixel on the line of pixels being measured. Call this $A_i$.

(3) Starting out of focus is a known direction, adjust the focus until a peak in variance is found. Call this value of variance $P_i$.

(4) For each image, record $A_i$ and $T_i$, where $T_i = P_i/2$. Each of these pairs may be thought of as constituting a point on a graph of $T_i$ verses $A_i$.

(5) Fit a best straight line to the graph and find its coefficients C and K:

$$T = C*A + K$$

The best fitting straight line or higher order polynomial in a least squares sense can be found by regression techniques. In one embodiment, C is $4.55 \times 10^{-6} \pm 10\%$ and K is $35.58 \pm 10\%$.

More specifically, the focus process may include the following steps:

1. Put the image out of focus in a known direction;
2. Adjust the focus until the variance exceeds T;
3. Continue adjusting the focus in the same direction (but perhaps more slowly) until the variance drops by a percentage P below the maximum value seen after step 2; and
4. If desired, adjust focus in the reverse direction (perhaps more slowly still) to find the peak in variance more closely.

The calculations of variance and threshold may be performed by standard analog techniques using multipliers and summing amplifiers, or the video signal may be digitized and the calculations performed by a computer In a digital system, the differentiation may consist of calculating the differences between adjacent picture elements, or a more complex digital filter of the type known to the one of skill in the art may be used. In the preferred embodiment the digitized and processed by a digital video signal is signal processor such as a Motorola DSP-56001. If a digital computer is utilized, a pseudocode version of a program (written in the language C) which could be used to drive a microscope to focus is included in Table 1 (©Copyright, 1988, Prometrix, Inc.).

TABLE 1

```
/* AUTOFOCUS CODE HEADER */
/* Declarations of routines in this package */
int autofocus( float dof, float start_position, float stop_limit);
long calculate_dvariance( char * line_buffer );
long calculate_evariance( char * line_buffer );
long calc_sum_of_squares( char * line_buffer );
/* Definitions used in this code */
#define AND &&
#define NOT !
typedef int BOOLEAN;
#define TRUE 1
#define FALSE 0
/* Global Calibration Variables used by routines in this package */
int focus_line; /* number of even video line that crosses Focus ruling */
int focus_lpix; /* pixel number of start of left Focus segment */
int focus_lend; /* pixel number of end of left Focus segment (>start) */
int focus_rpix; /* pixel number of start of right Focus segment (>left) */
int focus_rend; /* pixel number of end of right Focus segment (>start) */
float est_var_K0; /* correlation coefficient for estimated variance */
float est_var_K1; /* correlation coefficient for estimated variance */
float peak_pct = 0.9; /* percent of variance (avoid noise peaks in max) */
/* External Functions for Vertical (Z-Axis) Motion */
extern int set_Z_speed( int speed_code ); /* set various speeds */
extern int high_speed( float depth_of_focus ); /* selects high speed code */
extern int low_speed( float depth_of_focus ); /* selects low speed code */
extern int move_Z( float new_Z_coord ): /* start Z-axis motion */
extern int signal_Z_stop(): /* stop Z motion with overshoot corrections */
extern int wait_till_motion_done(); /* wait till Z motion stopped */
extern int is_Z_still_moving(); /* polled, returns non-0 if Z moving,else 0 */
/* External Functions for Video Sync and Measurement */
```

TABLE 1-continued

```
extern int wait_for_field( int odd); /* synchronize with vertical video fld*/
extern int capture_image_line( int video_line_number, char * line_buffer );
/* This routine must capture pixel brightness intensities from a particular
video line into the given buffer as fast as possible after that data has
been converted by the 8-bit video A-to-D converter.
*/
/* AUTOFOCUS CODE MAIN ROUTINE */
autofocus (dof, start_position, stop_limit)
float dof; /* depth of focus of current objective lens; determines speed */
float start_position; /* Z position at which to start focusing */
float stop_limit; /* Z position maximum limit during focusing (>start) */
unsigned char buffer[512]; /* one line of pixel brightnesses */
BOOLEAN found=0, /* flag to terminate focusing loops */
odd_flag=focus_line & 1; /* EVEN field if line is even, else ODD */
long var; /* stores current variance */
long estimated_var; /* stores estimated variance (ends COARSE) */
long peak_var; /* stores maximum variance (ends FINE) */
/* PREFOCUS move up to be out of focus, take brightness sample */
set_Z_speed( MAX_Z_SPEED );
move_Z( start_position );
wait_till_motion_done();
wait_for_field( odd_flag ); /* wait for proper video field */
capture_image_line( focus_line, buffer );
estimated_var = calculate_evariance (buffer);
/* COARSE FOCUS - move down at higher speed until focus is detected */
set_Z_speed( high_speed(dof) ):
move_Z( stop_limit );
while( is_Z_still_moving() AND NOT found )
{
wait_for_field( odd_flag ); /* wait for proper video field */
capture_image_line( focus_line, buffer );
var = calculate_dvariance( buffer );
if (var >= estimated_var)
{
signal_Z_stop();
found = TRUE;
}
}
wait_til_motion_done();
if (NOT found)
return COARSE_NOT_FOUND_ERROR_CODE;
/* FINE F OCUS move down at lower speed until variance peak is found *
wait_for_field( odd_flag ); /* wait for proper video field */
capture_image_line( focus_line, buffer );
peak_var = calculate_dvariance( buffer );
set_Z_speed( low_speed(dof) );
found = FALSE;
wait_for_field( NOT odd_flag ); /* wait for other video field */
move_Z( stope_limit ); /* start motion toward limit */
while ( is_Z_still_moving() AND NOT found )
{
wait_for_field( odd_flag ); /* wait for proper video field */
capture_image_line( focus_line, buffer );
var = calculate_dvariance( buffer );
if( var < peak_var * peak_pot ) /* look for X % drop to avoid noise */
{
signal_Z_stop();
found = TRUE;
else if (var > peak_var) /* update calculated maximum */
peak_var = var;
}
wait_till_motion_done();
if (NOT found)
return FINE_NOT_FOUND_ERROR_CODE;
return NO_ERRORS_CODE:
/* AUTOFOUUS CODE SUBROUTINES
/* NOTE: These routines only look at the parts of the video line actually
occupied by the Focus ruling using constants that depend on
the physical alignment of the ruling to the camera raster pattern.
Also note, these can be coded in Assembly Language for added speed.
*/
/* Code for Calculating Differential Variance (defined as proportional to */
/* the sum of squares of the brightness differences between adjacent pixels) */
long calculate_dvariance( buffer )
unsigned char * buffer;
long sum=0L;
int counter, dif, length
for( counter = focus_lpix + 1; counter < focus_lend; counter++)
{
dif = buffer[counter]- buffer[counter-1];
sum += (unsigned) (dif * dif);
}
```

TABLE 1-continued

```
for( counter = focus_rpix + 1; counter < focus_rend; counter++)
{
dif = buffer[counter]- buffer[counter-1];
sum = (unsigned) (dif * dif);
}
length = focus_lend - focus_lpix + focus_rend - focus_rpix - 1:
return ( sum / length ):
/* Code for Calculating Estimated Variance (func: of sum of brightness squared)*/
long calculate_variance( buffer )
unsigned char * buffer;
long sum=OL;
int counter;
for( counter = focus_lpix; counter < focus_lend; counter++)
sum = (unsigned) (buffer[counter]* buffer[counter]);
for( counter = focus_rpix; counter < focus_rend; counter ++)
sum = (unsigned) (buffer[counter]* buffer[counter]);
return ( (long) (est_var_K0 + est_var_K1 * sum + 0.5) );
```

The variance determination may be performed over more than one line of the image, or, over only a portion of a line, or over any region of the image. Preferably one line across the CCD array is utilized.

It is to be understood that the above description is intended to be illustrative and not restrictive. Many embodiments will be apparent to those of skill in the art upon reviewing the above description. For example, the autofocusing system could be used in magnification systems other than those used to inspect semiconductor devices, such as metallurgical applications. Further, the system could be used as a tracking system if provided with a sufficiently fast signal processor. Additionally, any other optical system could be used for magnification of a sample. Further, the invention could be used by projecting "light" areas onto the sample rather than "dark" areas. Still further, while the invention has been described with reference to a CCD camera, a wide variety of devices could be used in lieu of a CCD such as a charge transfer device, charge injection devices, metal insulator semiconductor transistor arrays, junction charge coupled devices, schottky barrier devices, and the like. The scope of the invention should, therefore, be determined not with reference to the above description, but should instead be determined with reference to the appended claims, along with the full scope of equivalents to which such claims are entitled.

What is claimed is:

1. Apparatus for focusing a microscope comprising:
   means for projecting an area of varied light intensity through an objective of the microscope onto a specimen surface;
   means for measuring light intensity of an image reflected from said surface at a plurality of locations, said plurality of locations lying substantially along a path passing through said area of varied light intensity;
   means for determining a derivative of a factor related to said light intensity as a function of said location; and
   means for adjusting focus of said microscope until a variation in said derivative is substantially maximized.

2. Apparatus as recited in claim 1 wherein said means for projecting an area of varied light intensity comprises a transparent plate containing an opaque area.

3. Apparatus as recited in claim 2 wherein said transparent plate is located between a colliminating lens and a relay lens of said microscope.

4. Apparatus as recited in claim 1 wherein said means for measuring light intensity comprises an electronic image sensor.

5. Apparatus as recited in claim 4 wherein said electronic image sensor is a charge coupled device.

6. Apparatus as recited in claim 1 wherein said variation is defined by an equation of the form:

$$\frac{\sum_{i=1}^{n} (d_i)^2}{n-1} - \frac{\left(\sum_{i=1}^{n} d_i\right)^2}{n(n-1)}$$

where
$d_i$ is said derivative at a location
n is the number of locations.

7. Apparatus as recited in claim 6 wherein the term $$\frac{\left(\sum_{i=1}^{n} d_i\right)^2}{n(n-1)}$$

may be assumed to be substantially zero and is neglected.

8. Apparatus as recited in claim 1 further comprising means for starting said microscope in an out of focus position, a direction of which is known, and means for moving said microscope towards focus while monitoring said light intensity at said plurality of locations.

9. Apparatus as recited in claim 8 further comprising means for passing peak variations in a derivative of said intensity which do not exceed a desired threshold.

10. Apparatus as recited in claim 9 further comprising means for passing said substantially maximized variation by a desired percentage.

11. Apparatus as recited in claim 10 wherein said desired percentage is about 5 to 10%.

12. Apparatus as recited in claim 9 wherein desired threshold is calculated by an equation of the form:

$$T = C*A + K$$

where:
T is said threshold
A is an average instantaneous voltage produced by pixels across a line of interest
C is $4.55 \times 10^{-6} \pm 10\%$
K is $35.58 \times \pm 10\%$.

13. Apparatus as recited in claim 1 wherein said means for projecting an area of varied light intensity comprises means for filtering a wavelength of interest and said means for measuring light intensity comprises means for measuring an intensity of light at said wavelength of interest.

14. Apparatus as recited in claim 13 wherein said wavelength of interest is from infrared to ultraviolet.

15. A method of focusing a microscope comprising:
projecting at least one area of varied light intensity onto a sample surface through an objective of said microscope;
measuring a factor related to intensity of the light at a plurality of locations, said plurality of locations lying along a path through an image of said area of varied light intensity;
calculating a derivative of said factor related to said light intensity with respect to said location; and
adjusting focus of the microscope until a variation in said derivative is substantially maximized.

16. The method as recited in claim 15 wherein the step of projecting an area of varied light intensity comprises a step of placing a transparent plate into an illumination beam of said microscope, said plate having at least one opaque area therein.

17. The method as recited in claim 16 wherein said plate is placed into said illumination beam between a colliminating lens and a relay lens of said microscope.

18. The method as recited in claim 15 wherein said variation is calculated with an equation of the form:

$$\frac{\sum_{i=1}^{n}(d_i)^2}{n-1} - \frac{\left(\sum_{i=1}^{n}d_i\right)^2}{n(n-1)}$$

where:
$d_i$ is said derivative at a location i
n is the number of locations.

19. The method as recited in claim 15 wherein said step of adjusting further comprises the step of starting said microscope in an out of focus position, the direction of which is known and the step of moving said microscope towards focus while monitoring said light intensity at a plurality of locations.

20. The method as recited in claim 19 further comprising the step passing peaks in said variation which do not exceed a desired threshold.

21. The method as recited in claim 20 wherein the desired threshold is calculated with an equation of form:

T32 C*A+K where
T is said threshold
A is an average instantaneous voltage produced by pixels across a line of interest
C and K are constants determined by the steps of:
(i) selecting a set of typical images (I) of varying brightness and contrast;
(ii) for each image $I_i$ calculating a summation of squares of voltage along a line of pixels $A_i$;
(iii) finding a peak value of variance $P_i$;
(iv) for each image $I_1$, recording $A_i$ and $T_i$ where $T_i$ is related to $P_i$ by an equation of the form $P_i/2$; and
(v) finding a best straight line through said $P_i$ and $T_i$ to determine C and K in an equation of the form

T=C*A+K.

22. The method as recited in claim 19 further comprising the step of passing said substantially maximized variation by a desired percentage.

23. The method as recited in claim 22 wherein the desired percentage is about 10%.

24. The method as recited in claim 15 wherein the step of projecting at least one area of varied light intensity is a step of filtering light of a desired wavelength range and said intensity of light is an intensity of light in said desired wavelength range.

25. The method as recited in claim 24 wherein the desired wavelength range is selected from the group infrared and ultraviolet.

26. A microscope autofocusing kit comprising:
means for projecting at least one area of varied light intensity onto a, sample surface;
means for measuring light intensity at a plurality of locations through an image of said area of varied light intensity;
means for maximizing a variation in said derivative.

27. A microscope kit comprising:
(A) an illumination system comprising
(i) a lamp,
(ii) a relay lens,
(iii) a colliminating lens
(iv) a glass plate having a plurality of opaque areas therein, said plate adapted to be positioned between said relay lens and said colliminating lens;
(B) beam splitter for receiving a beam from said colliminating lens;
(C) a microscope objective for receiving a beam from said beam splitter;
(D) means for transmitting a reflected beam to a reflective aperture plate;
(E) a spectrometer system adapted to receive a portion of a beam striking said reflective aperture plate;
(F) lenses for re-imaging a remaining beam from said reflective aperture on a CCD array;
(G) means for determining light intensity along a path of said CCD array, said path passing through an image of said opaque area;
(H) a digital computer programmed to determine a variation in a derivative of parameter related to light intensity along said path; and
(I) means for adjusting a focus of said microscope until;
(i) said variation exceeds a threshold level calculated from an equation of the form:

T=C*A+K where
T is said threshold
A is an average instantaneous voltage produced by pixels along said path
C is $4.55 \times 10^{-6} \pm 10\%$
K is $35.58 \pm 10\%$
(ii) said variation passes a substantially maximized variation by about 10%.

* * * * *